(12) United States Patent
Fukuda

(10) Patent No.: US 12,550,877 B2
(45) Date of Patent: Feb. 17, 2026

(54) FISHING ROD GUIDE COVER

(71) Applicant: GLOBERIDE, Inc., Higashikurume (JP)

(72) Inventor: Kazuya Fukuda, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/711,463

(22) PCT Filed: Nov. 29, 2022

(86) PCT No.: PCT/JP2022/043857
§ 371 (c)(1),
(2) Date: May 17, 2024

(87) PCT Pub. No.: WO2023/132154
PCT Pub. Date: Jul. 13, 2023

(65) Prior Publication Data
US 2025/0049012 A1 Feb. 13, 2025

(30) Foreign Application Priority Data
Jan. 7, 2022 (JP) .................................. 2022-001941

(51) Int. Cl.
*A01K 97/08* (2006.01)
(52) U.S. Cl.
CPC ..................................... *A01K 97/08* (2013.01)
(58) Field of Classification Search
CPC ..................................................... A01K 97/08
See application file for complete search history.

(56) References Cited

U.S. PATENT DOCUMENTS

| 2,869,277 A | * | 1/1959 | Breithaupt | ............. | A01K 97/08 |
| | | | | | D22/134 |
| 4,261,129 A | * | 4/1981 | Ohmura | ................. | A01K 87/04 |
| | | | | | 43/25 |

(Continued)

FOREIGN PATENT DOCUMENTS

| JP | S48-089787 U | 10/1973 |
| JP | H03-050873 U | 5/1991 |

(Continued)

OTHER PUBLICATIONS

Jun. 20, 2024 International Preliminary Report on Patentability issued in International Patent Application No. PCT/JP2022/043857.

(Continued)

*Primary Examiner* — Richard G Davis
(74) *Attorney, Agent, or Firm* — Oliff PLC

(57) ABSTRACT

A fishing rod guide cover capable of not only protecting a rod tip portion and a rod tail portion of a fishing rod regardless of whether or not a reel or the like is attached, but also preventing the fishing rod from being detached from a cover structure, while simply and reliably accommodating and detaching the fishing rod of various types and dimensions. A fishing rod guide cover including a first cover portion capable of accommodating a rod tip portion of a fishing rod, and a second cover portion capable of accommodating a rod tail portion of the fishing rod, in which the first cover portion and the second cover portion are connected to each other via a connection portion, and a length in an extending direction of the connection portion is adjustable.

17 Claims, 4 Drawing Sheets

(56) References Cited

U.S. PATENT DOCUMENTS

| | | | | | |
|---|---|---|---|---|---|
| 4,456,284 | A | * | 6/1984 | Saka | A63C 11/025 |
| | | | | | 294/147 |
| 6,155,001 | A | * | 12/2000 | Marin | A01K 97/01 |
| | | | | | 43/26 |
| 6,865,841 | B2 | * | 3/2005 | Wieringa | A01K 97/08 |
| | | | | | 206/315.11 |
| 2002/0178642 | A1 | | 12/2002 | Garcia | |
| 2013/0306506 | A1 | * | 11/2013 | Fraser | A01K 97/08 |
| | | | | | 206/315.11 |
| 2018/0192628 | A1 | * | 7/2018 | Burts | A45F 3/14 |
| 2018/0192629 | A1 | * | 7/2018 | Arnold | A01K 97/08 |
| 2020/0137999 | A1 | * | 5/2020 | Smith | A01K 97/08 |

FOREIGN PATENT DOCUMENTS

| | | | |
|---|---|---|---|
| JP | H10-028494 A | 2/1998 | |
| JP | 2004-222655 A | 8/2004 | |
| JP | 2007-228831 A | 9/2007 | |
| JP | 2008-000101 A | 1/2008 | |
| JP | 2009-082030 A | 4/2009 | |
| JP | 2012-244958 A | 12/2012 | |
| JP | 2021-121178 A | 8/2021 | |

OTHER PUBLICATIONS

Feb. 17, 2025 Examination Report issued in Australian Patent Application No. 2022430279.
Jan. 31, 2023 International Search Report issued in International Patent Application No. PCT/JP2022/043857.
Aug. 19, 2025 Office Action issued in Japanese Application No. 2023-572377.
Sep. 27, 2025 Office Action issued in Chinese Application No. 202280076217.3.

* cited by examiner

FISHING ROD GUIDE COVER

TECHNICAL FIELD

Cross Reference

The present application claims priority based on Japanese Patent Application No. 2022-001941 (filed on Jan. 7, 2022), the contents of which are incorporated herein by reference in their entirety.

The present invention particularly relates to a fishing rod guide cover capable of accommodating a rod tip portion and a rod tail portion of a fishing rod comprising a telescopic rod.

BACKGROUND ART

Various rod cases capable of accommodating a fishing rod are conventionally known. As such a rod case, for example, there is a rod case that includes a case main body, accommodates a fishing rod therein, and includes a cord for fixing the fishing rod in order to prevent the fishing rod from moving inside.

As a means for restraining a rod member from moving and protecting the same, Patent Literature 1 discloses a fishing rod protector capable of restraining free extension of each of a plurality of rod members and holding the members in a contracted state when a telescopic fishing rod obtained by combining a plurality of rod members having different diameters so as to be extendable with a rod member having a small diameter on an inner side, the protector including a cap portion capable of covering an upper end portion of each of the plurality of rod members in the contracted state and a fishing line guiding member projecting in a radial direction from the upper end portion, and a belt portion extending in a circumferential direction of the cap portion at a lower end portion of the cap portion, the belt portion formed so as to be fastened to a required site of an outer surface of the lower end portion.

Patent Literature 2 discloses a top cover of a fishing rod including a rod body attaching tool in a base portion, the top cover of the fishing rod including a pair of cover halves in a double-door style opened to be developed, deformable cushion pieces loaded into inner recesses of the pair of cover halves, respectively, and fasteners provided at edges of the pair of cover halves, respectively, and are closed with each other to close the inner recesses, in which the cover halves are formed of a flexible material.

CITATION LIST

Patent Literature

Patent Literature 1: JP H10-028494 A
Patent Literature 2: JP 2012-244958 A

SUMMARY OF INVENTION

Technical Problem

However, although the structure disclosed in any of the patent literatures can accommodate a tip end portion of the rod with a reel or the like being attached, there is a problem that the tip end portion of the rod moves in a longitudinal direction of the rod depending on a type and a dimension of the rod, and is completely detached from a cover structure in some cases.

An object of an embodiment of the present invention is to provide a fishing rod guide cover capable of not only protecting a rod tip portion and a rod tail portion of a fishing rod regardless of whether or not a reel or the like is attached, but also preventing the fishing rod from being detached from a cover structure, while simply and reliably accommodating and detaching the fishing rod of various types and dimensions.

Other objects of the embodiment of the present invention will become apparent by reference to the entire specification.

Solution to Problem

A fishing rod guide cover according to one embodiment of the present invention comprises a first cover portion capable of accommodating a rod tip portion of a fishing rod, and a second cover portion capable of accommodating a rod tail portion of the fishing rod, in which the first cover portion and the second cover portion are connected to each other via a connection portion, and a length in an extending direction of the connection portion is adjustable.

In the fishing rod guide cover according to one embodiment of the present invention, the connection portion comprises a first detachable portion with one end attached to the first cover portion, and a second detachable portion with one end attached to the second cover portion, and the first detachable portion and the second detachable portion are detachably attached to each other.

In the fishing rod guide cover according to one embodiment of the present invention, the connection portion is a detachable member with one end detachably attached to the first cover portion and the other end detachably attached to the second cover portion.

In the fishing rod guide cover according to one embodiment of the present invention, each of the first detachable portion, the second detachable portion, or the detachable member is detachable by a hook-and-loop fastener.

In the fishing rod guide cover according to one embodiment of the present invention, the first detachable portion, the second detachable portion, or the detachable member is detachable by a linear fastener, a belt, a zipper, a button, a cord, a band, a handle cover, a tape, or a magnet.

In the fishing rod guide cover according to one embodiment of the present invention, the length in the extending direction of the connection portion is adjustable in a range from 400 mm to 1000 mm.

In the fishing rod guide cover according to one embodiment of the present invention, at least any one of the first cover portion and the second cover portion is formed into a substantially U shape as seen in a cross section perpendicular to the extending direction to the connection portion.

In the fishing rod guide cover according to one embodiment of the present invention, at least any one of the first cover portion and the second cover portion comprises a flexible member on an inner surface.

In the fishing rod guide cover according to one embodiment of the present invention, the flexible member is formed of EVA or foamed rubber.

Advantageous Effects of Invention

According to various embodiments of the present invention, it is possible to provide a fishing rod guide cover capable of not only protecting a rod tip portion and a rod tail portion of a fishing rod regardless of whether or not a reel or the like is attached, but also preventing the fishing rod from being detached from a cover structure, while simply

DESCRIPTION OF EMBODIMENTS

Figure 1A:
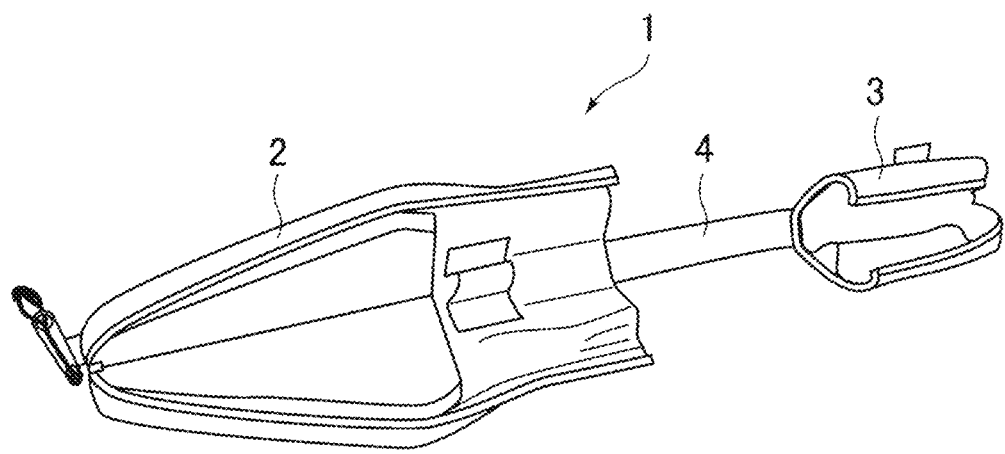
FIG. 1A is a diagram for describing a fishing rod guide cover 1 according to one embodiment of the present invention.

Various embodiments of the present invention will be hereinafter described with reference to the drawings as appropriate. Note that, common components in the drawings are denoted by the same reference signs. Each drawing is not necessarily drawn to an accurate scale for the sake of convenience in description. Hereinafter, the embodiments of the present invention will be described with reference to the drawings.

Figure 1B:
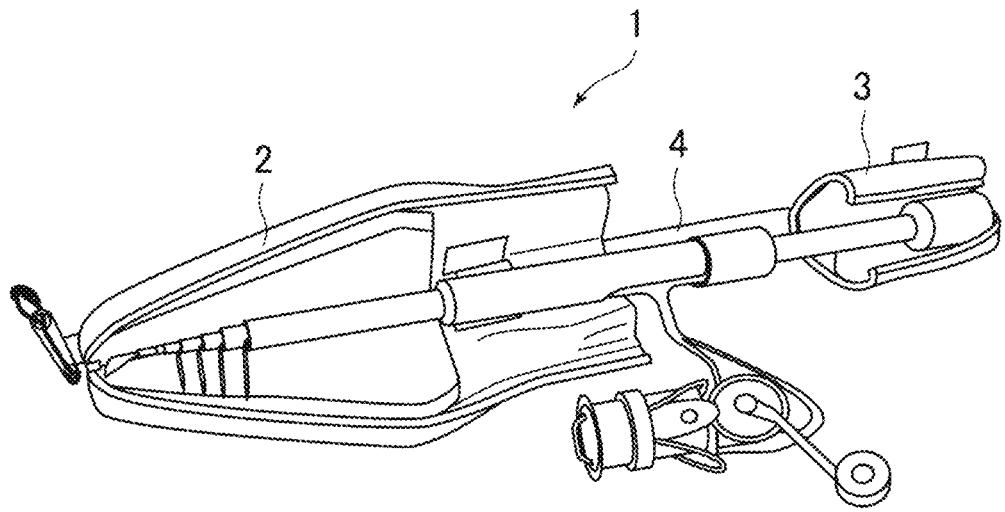
FIG. 1B is a diagram for describing a fishing rod guide cover 1 according to one embodiment of the present invention.
Figure 1C:
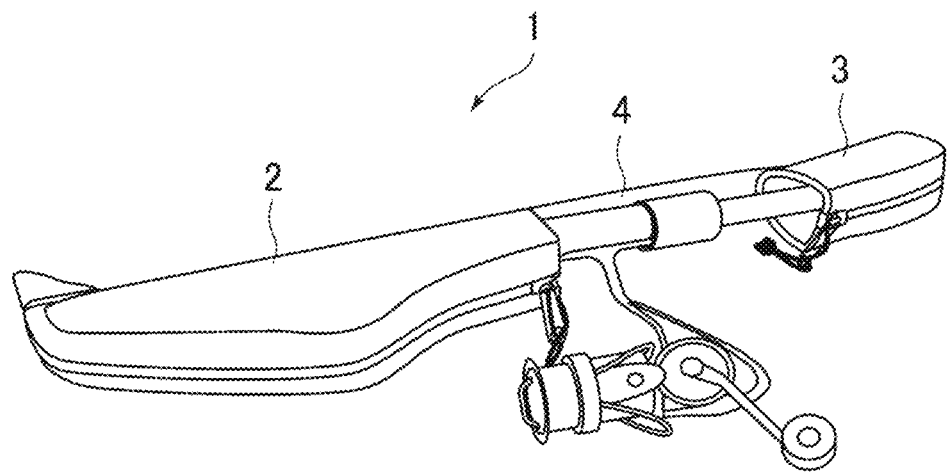
FIG. 1C is a diagram for describing a fishing rod guide cover 1 according to one embodiment of the present invention.

First, a fishing rod guide cover 1 according to one embodiment of the present invention will be described with reference to FIG. 1. As illustrated in the drawing, the fishing rod guide cover 1 according to one embodiment of the present invention comprises a first cover portion 2 capable of accommodating a rod tip portion 11 of a fishing rod 10, and a second cover portion 3 capable of accommodating a rod tail portion 12 of the fishing rod 10, in which the first cover portion 2 and the second cover portion 3 are connected to each other via a connection portion 4, and a length in an extending direction of the connection portion 4 is adjustable.

According to the fishing rod guide cover 1 according to one embodiment of the present invention, it is possible to provide the fishing rod guide cover capable of not only protecting the rod tip portion and the rod tail portion of the fishing rod regardless of whether or not a reel or the like is attached, but also preventing the fishing rod from being detached from a cover structure, while simply and reliably accommodating and detaching the fishing rod of various types and dimensions.

In this manner, by adjusting the length of the connection portion in accordance with the dimension of the fishing rod to be accommodated and accommodating the rod tip portion and the rod tail portion of the fishing rod in the first cover portion and the second cover portion, respectively, it becomes possible to prevent the fishing rod from moving in an extending direction thereof (the extending direction of the connection portion) and any tip end portion from being detached to fall or separate from the first cover portion or the second cover portion. That is, since the first cover portion and the second cover portion not only accommodate the end portion of the fishing rod but also are connected to each other via the connection portion, they also play a role of preventing the fishing rod from being detached, so that it is possible not only to protect the rod tip portion and the rod tail portion of the fishing rod but also to prevent the fishing rod from being detached from the cover structure.

Figure 2:
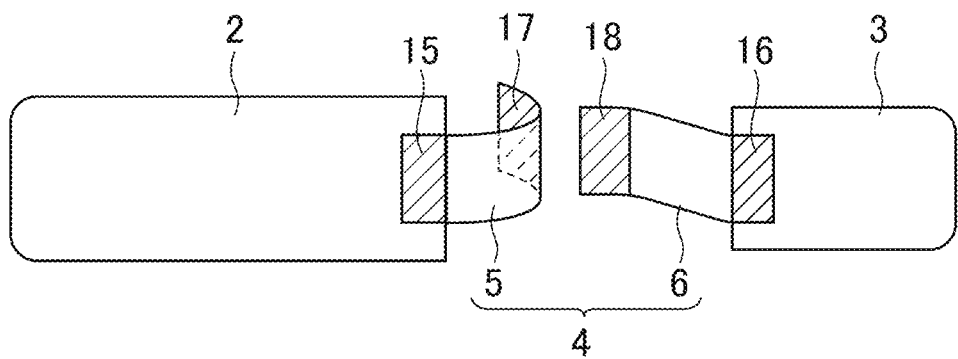
FIG. 2 is a diagram for describing a connection portion 4 in the fishing rod guide cover 1 according to one embodiment of the present invention.

As illustrated in FIG. 2, in the fishing rod guide cover 1 according to one embodiment of the present invention, the connection portion 4 comprises a first detachable portion 5 with one end 15 attached to the first cover portion 2, and a second detachable portion 6 with one end 16 attached to the second cover portion 3, and the first detachable portion 5 and the second detachable portion 6 are detachably attached to each other. More specifically, the other end 17 of the first detachable portion 5 and the other end 18 of the second detachable portion 6 are detachably attached to each other. In order to be able to adjust the length of the connection portion 4, detachable positions of the first detachable portion 5 and the second detachable portion 6 may be optional positions other than end positions thereof. In this manner, it is possible to accommodate the fishing rod of various dimensions. Here, a configuration in which one or a plurality of intermediate portions (not illustrated) is appropriately provided between the first detachable portion 5 and the second detachable portion 6 described above may be adopted.

Figure 3:
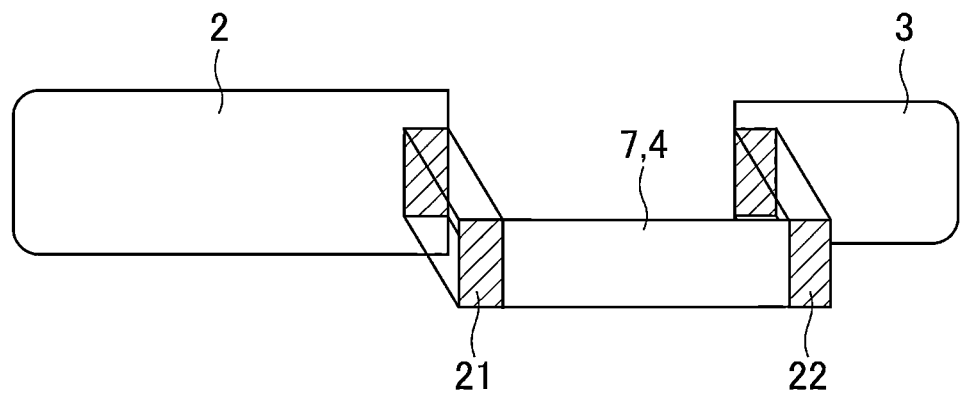
FIG. 3 is a diagram for describing the connection portion 4 in the fishing rod guide cover 1 according to one embodiment of the present invention.

As illustrated in FIG. 3, in the fishing rod guide cover 1 according to one embodiment of the present invention, the connection portion 4 may be a detachable member 7 with one end 21 detachably attached to the first cover portion 2 and the other end 22 detachably attached to the second cover portion 3. At that time, the detachable member 7 is attached to each of the first cover portion 2 and the second cover portion 3 also at an optional position other than the one end 21 and the other end 22, so that the length (length in the extending direction) of the connection portion 4 can be adjusted. In this manner, it is possible to accommodate the fishing rod of various dimensions.

In the fishing rod guide cover 1 according to one embodiment of the present invention, each of the first detachable portion 5, the second detachable portion 6, or the detachable member 7 described above is detachable by a hook-and-loop fastener. For example, in order to make them detachable, the first detachable portion 5 and the second detachable portion 6 can be detachably attached with a male hook-and-loop fastener and a female hook-and-loop fastener arranged on the first detachable portion 5 and the second detachable portion 6. The detachable member 7 can be detachably attached to the first cover portion 2 and the second cover portion 3 by arranging a male hook-and-loop fastener on the detachable member 7 and arranging a female hook-and-loop fastener on the first and second cover portions 2 and 3. The detachable member is not limited to these aspects, and can be appropriately changed.

In the fishing rod guide cover according to one embodiment of the present invention, the first detachable portion 5, the second detachable portion 6, or the detachable member 7 is detachable by a hook-and-loop fastener, a linear fastener, a belt, a zipper, a button, a cord, a band, a handle cover, a tape, or a magnet. In a case of using the magnet, for example, the magnet may be arranged on one side and a magnetic body attractable to the magnet may be arranged on the other side. Not only a plurality of magnets is simply combined, but also a metal and a magnet may be combined as with a watch band, for example. The first detachable portion 5, the second detachable portion 6, or the detachable member 7 is not limited thereto, and various conventionally known structures can be adopted.

In the fishing rod guide cover 1 according to one embodiment of the present invention, the length in the extending direction of the connection portion 4 is adjustable in a range from 400 mm to 1000 mm. In this manner, it is possible to accommodate the fishing rod of various dimensions. As a material of the connection portion 4, neoprene, nylon, a stretch belt, a rubber belt or the like can be considered, but the material is not limited thereto. Note that, the stretch belt refers to a belt formed of a stretchable material. As the connection portion 4, a so-called shoulder belt (for example, the shoulder belt including various buckles or the like) of which length is adjustable, the shoulder belt used for a bag, a cooler box or the like may be used.

Figure 4:
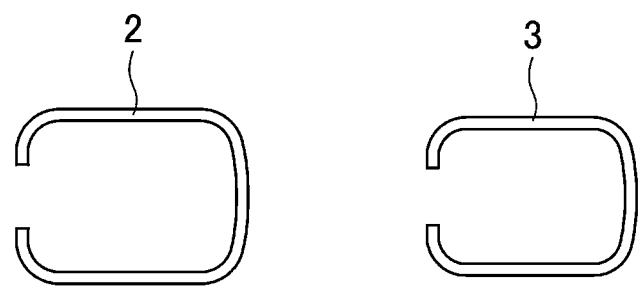
FIG. 4 is a diagram for describing a first cover portion 2 and a second cover portion 3 in the fishing rod guide cover 1 according to one embodiment of the present invention.

Next, as illustrated in FIG. 4, in the fishing rod guide cover 1 according to one embodiment of the present invention, at least any one of the first cover portion 2 and the second cover portion 3 (in the illustrated example, both the first cover portion 2 and the second cover portion) is formed into a substantially U shape as seen in a cross section perpendicular to the extending direction of the connection portion 4. Note that, the substantially U shape is used to include not only a strict U shape but also a range of a substantially U shape. In this manner, the fishing rod can be accommodated through an opening of the substantially U shape. In the fishing rod guide cover 1 according to one embodiment of the present invention, at least any one of the first cover portion 2 and the second cover portion 3 (in the illustrated example, both the first cover portion 2 and the second cover portion) may be formed into a substantially inverse C shape or another shape as seen in a cross section perpendicular to the extending direction of the connection portion 4. In order to prevent the fishing rod from coming out of the opening when these cross-sectional shapes are formed, although not illustrated in FIG. 4, an opening/closing portion for opening/closing the opening described above of at least any one of the first cover portion 2 and the second cover portion 3 may be provided at an opening end of the opening described above of at least any one of the first cover portion 2 and the second cover portion 3. For example, a linear fastener (for example, refer to FIGS. 1, 2, and 3), a hook-and-loop fastener, a belt, a zipper, a button, a cord, a band, a handle cover, a tape, a magnet or the like may be provided so as to open or close the opening. In this manner, each end portion of the fishing rod can be reliably accommodated in each of the first cover portion 2 and the second cover portion in a circumferential direction.

In the fishing rod guide cover 1 according to one embodiment of the present invention, at least any one of the first cover portion 2 and the second cover portion 3 comprises a flexible member on an inner surface thereof. In this manner, it is possible to more reliably protect each tip end portion of the fishing rod. In the fishing rod guide cover according to one embodiment of the present invention, EVA or foamed rubber can be used as such flexible member.

In the fishing rod guide cover 1 according to one embodiment of the present invention, shapes and dimensions of the first cover portion 2 and the second cover portion 3 can be variously considered in accordance with the shape and dimension of the fishing rod assumed to be accommodated, so that they are not limited to specific dimensions and shapes. For example, a cap-shaped member may be used as at least any one of the first cover portion 2 and the second cover portion 3. A bag-shaped member (cover member) formed of a woven fabric, a sheet or the like may be used. In order to adapt to the shapes and dimensions of various fishing rods, by preparing a plurality of types of the first cover portion 2 and the second cover portion 3, it is possible to select appropriate first and second cover portions 2 and 3 according to the shape and dimension of the fishing rod that is wanted to be actually accommodated while using the common connection portion 4. In this manner, a degree of freedom of accommodation of the fishing rod can be further increased.

Figure 5:
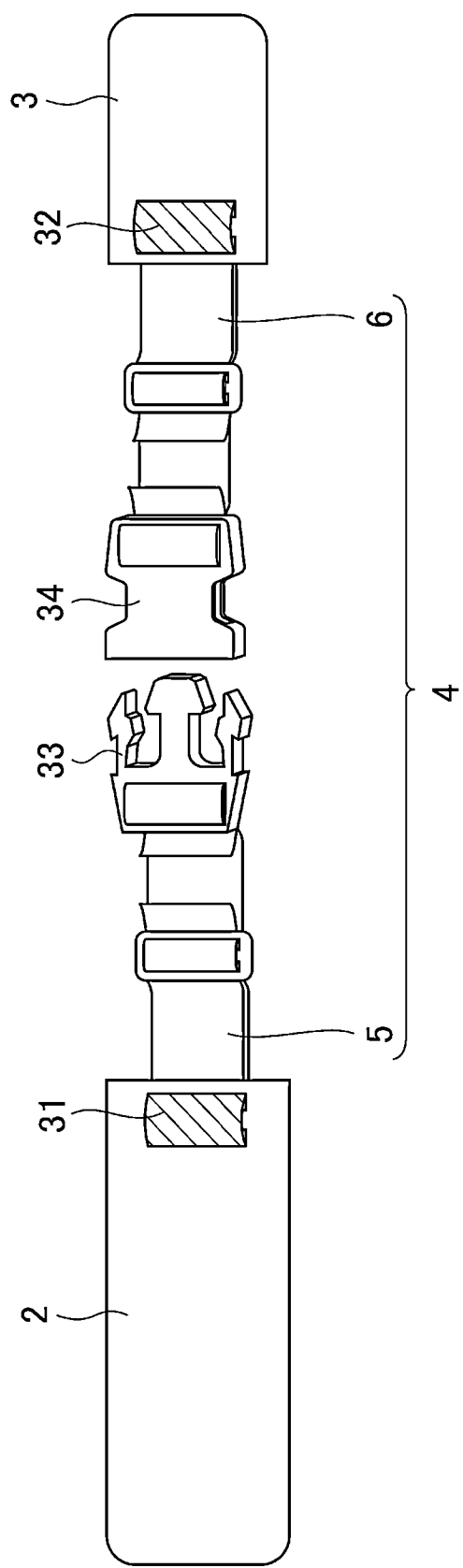
FIG. 5 is a diagram for describing the connection portion 4 in the fishing rod guide cover 1 according to another embodiment of the present invention.

Next, a fishing rod guide cover 1 according to another embodiment of the present invention will be described with reference to FIG. 5. In the fishing rod guide cover 1 according to another embodiment of the present invention, a connection portion 4 comprises a first detachable portion 5 with one end 31 attached to a first cover portion 2, and a second detachable portion 6 with one end 32 attached to a second cover portion 3, and the first detachable portion 5 and the second detachable portion 6 are detachably attached to each other. More specifically, the other end 33 (in the illustrated example, a locking portion of a buckle) of the first detachable portion 5 and the other end 34 (in the illustrated example, a locked portion of the buckle) of the second detachable portion 6 are detachably attached to each other. At that time, a length of the connection portion 4 can be adjusted by making a length of at least any one of the first detachable portion 5 and the second detachable portion 6 adjustable using a ladder lock or the like (not illustrated). In this manner, it is possible to accommodate the fishing rod of various dimensions.

Dimensions, materials, and arrangement of the components described in the present specification are not limited to those explicitly described in the embodiments, and these components may be modified to have optional dimensions, materials, and arrangement that might fall within the scope of the present invention. Components not explicitly described in the present specification can also be added to the described embodiment, or some of the components described in each embodiment can be omitted.

REFERENCE SIGNS LIST

1 Fishing rod guide cover
2 First cover portion
3 Second cover portion
4 Connection portion
5 First detachable portion
6 Second detachable portion
7 Detachable member
10 Fishing rod
11 Rod tip portion
12 Rod tail portion
15 One end
16 One end
17 Other end
18 Other end
21 One end
22 Other end

The invention claimed is:
1. A fishing rod guide cover comprising:
a first cover portion capable of accommodating a rod tip portion of a fishing rod, and
a second cover portion capable of accommodating a rod tail portion of the fishing rod, wherein
the first cover portion and the second cover portion are connected to each other via a connection portion, and a length in an extending direction of the connection portion is adjustable, the first cover portion and the second cover portion are substantially U shaped with an opening as seen in a cross section perpendicular to the extending direction of the connection portion, and the opening comprises an opening and closing portion configured to open and close the opening.

2. The fishing rod guide cover according to claim 1, wherein the connection portion comprises a first detachable portion with one end attached to the first cover portion, and a second detachable portion with one end attached to the second cover portion, and the first detachable portion and the second detachable portion are detachably attached to each other.

3. The fishing rod guide cover according to claim 2, wherein at least one of the first detachable portion and the second detachable portion is detachable by a hook-and-loop fastener.

4. The fishing rod guide cover according to claim 2, wherein at least one of the first detachable portion and the second detachable portion is detachable by a linear fastener, a belt, a zipper, a button, a cord, a band, a handle cover, a tape, or a magnet.

5. The fishing rod guide cover according to claim 1, wherein the connection portion is a detachable member with one end detachably attached to the first cover portion and the other end detachably attached to the second cover portion.

6. The fishing rod guide cover according to claim 5, wherein the detachable member is detachable by a hook-and-loop fastener.

7. The fishing rod guide cover according to claim 5, wherein the detachable member is detachable by a linear fastener, a belt, a zipper, a button, a cord, a band, a handle cover, a tape, or a magnet.

8. The fishing rod guide cover according to claim 1, wherein the length in the extending direction of the connection portion is adjustable in a range from 400 mm to 1000 mm.

9. The fishing rod guide cover according to claim 1, wherein at least any one of the first cover portion and the second cover portion comprises a flexible member on an inner surface.

10. The fishing rod guide cover according to claim 9, wherein the flexible member is formed of EVA or foamed rubber.

11. The fishing rod guide cover according to claim 1, wherein the first cover portion is configured to store a plurality of fishing line guides of the fishing rod, which is a telescopic rod, when the rod is in a stored state.

12. The fishing rod guide cover according to claim 11, wherein the first cover portion comprises a flexible member on an inner surface of the first cover for supporting the fishing line guides.

13. The fishing rod guide cover according to claim 12, wherein the first cover portion comprises a first wall portion that faces a tip portion of the telescopic rod in an extension direction, and the second cover portion comprises a second wall portion that faces a butt portion of the telescopic rod in the extension direction.

14. The fishing rod guide cover according to claim 11, wherein the first cover portion comprises a first wall portion that faces a tip portion of the telescopic rod in an extension direction, and the second cover portion comprises a second wall portion that faces a butt portion of the telescopic rod in the extension direction.

15. The fishing rod guide cover according to claim 12, wherein the first cover portion is configured to store at least a part of a reel seat on the telescopic rod when the telescopic rod is in a contracted state.

16. The fishing rod guide cover according to claim 1, wherein the opening is at an end portion in which the substantially U-shaped portion opens.

17. The fishing rod guide cover according to claim 1, wherein the first cover portion and the second cover portion each comprises an opening at an end portion in which the substantially U-shaped portion opens, and the first cover portion and the second cover portion are connected via the connecting portion on an opposite side of the opening in a direction perpendicular to the extending direction of the fishing rod guide cover.

* * * * *